(No Model.)
J. I. PLUMMER.
SHOVELING BOARD FOR WAGONS.
No. 291,767. Patented Jan. 8, 1884.
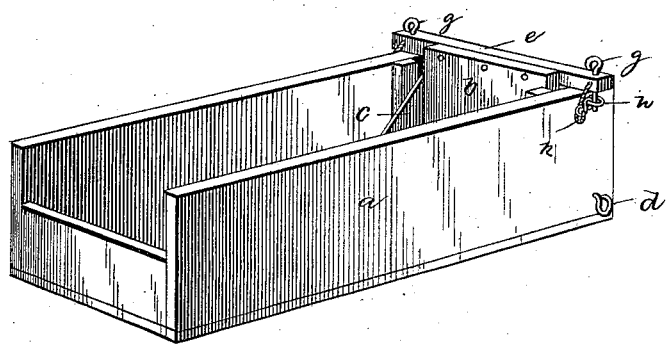
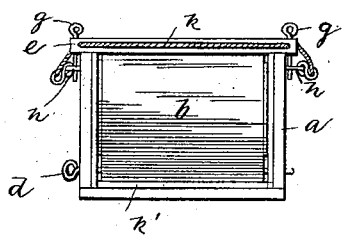
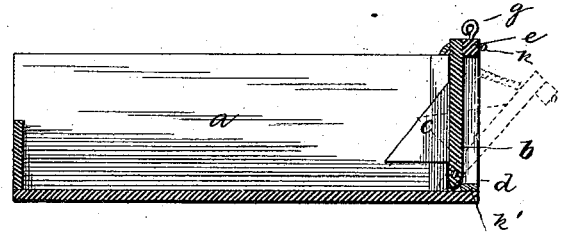
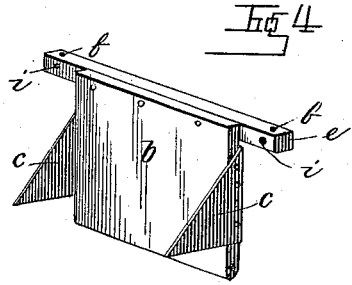
Witnesses:
Theo. Mungen.
J. T. Morrow
Inventor:
James I. Plummer
By Anderson & Smith,
his Attorneys

UNITED STATES PATENT OFFICE.

JAMES I. PLUMMER, OF DOUGLAS, KANSAS.

SHOVELING-BOARD FOR WAGONS.

SPECIFICATION forming part of Letters Patent No. 291,767, dated January 8, 1884.

Application filed October 24, 1883. (No model.)

*To all whom it may concern:*

Be it known that I, JAMES I. PLUMMER, a citizen of the United States, residing at Douglas, in the county of Butler and State of Kansas, have invented certain new and useful Improvements in End-Gates for Wagons; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 of the drawings is a representation of a perspective view. Fig. 2 is an end elevation. Fig. 3 is a vertical longitudinal sectional view, and Fig. 4 is a detail perspective view of the end-gate detached.

This invention has relation to end-gates for wagons. The end-gate is designed to be converted into a shoveling-board in unloading corn from the wagon-box, and thereby facilitate the unloading of the corn at the commencement of the operation; and the invention consists in the construction and novel arrangement of devices, as will be hereinafter fully described, and particularly pointed out in the claim appended.

Referring by letter to the accompanying drawings, $a$ designates the wagon-box, which may be of any ordinary construction, except as regards the end-gate or shoveling-board $b$. The shoveling-board $b$ is of the exact width of the inside of the wagon between the pairs of tail-board strips. The end-gate or shoveling-board $b$ is of wood, except the sides $c$, which are of sheet-iron, and are triangular in form, the base of the triangle being down when the shoveling-board is closed. The stay-rod or securing-rod $d$, which braces the side-boards of the wagon-box, forms the hinge for the shoveling-board $b$, and engages said board $b$ near its lower edge, as shown. A cross-strip, $e$, is bolted to the rear or outer face of the board $b$ at its upper edge, which edge extends a little above the edges of the side-boards of the wagon-box when the end-gate is closed. This cross-strip $e$ extends over the edges of the side-boards, and is provided with vertical holes $f$ near its ends for the passage of hook-pins $g$, which pass down through eyes $h\ h$, extending outwardly from the side-boards of the wagon-box to hold the gate closed. The cross strip or bar $e$ is also provided with lateral holes $i\ i$, near its ends, through which a rope, $k$, connected to the eyes $h\ h$, passes to give the proper incline to the shoveling-board $b$ when it is open, to permit the ready introduction of the shovel to unload the corn. When the gate is open, the sheet-iron sides prevent the corn from falling out at the sides of the gate. A cleat or strip, $k'$, is bolted to the rear upper face of the box $a$ at its extreme edge, and when the gate is open it rests upon it, and when closed it rests against it, so that the gate cannot be forced out at the bottom to bend the hinge-rod.

This device is cheap, simple, and convenient, and obviates the time and trouble attending the old way of unloading a portion of the load with the hands before commencing to use the scoop-shovel. The device may be used at both ends of the wagon-box, and may be used to unload potatoes, turnips, coal, and other articles that may be handled with the shovel.

Having thus fully described my invention, what I claim as new, and desire to secure by Letters Patent, is—

The combination, with the wagon-box, of an end-gate or shoveling-board hinged by a stay-rod passed through the side-boards of the box and the lower portion of the end-gate, and provided with the angular sheet-iron sides, and the cross-strip at its upper edge, having the vertical and lateral holes for the hook-pins and the supporting-rope, and the supporting-rope having hooks at its ends, and the eyes in the outside of the side-boards, whereby the hook-pins and the hooks on the supporting-rope may engage the eyes to hold the gate locked in a vertical position or open in an inclined position, as may be desired, substantially as specified.

In testimony whereof I affix my signature in presence of two witnesses.

JAMES I. PLUMMER.

Witnesses:
 E. H. HUTCHINS,
 W. STAPLETON.